United States Patent
Wang et al.

(10) Patent No.: US 10,232,737 B2
(45) Date of Patent: Mar. 19, 2019

(54) MOTOR VEHICLE AND STEERING WHEEL THEREOF

(71) Applicant: OPTIMUM BATTERY CO., LTD., Shenzhen, Guangdong (CN)

(72) Inventors: Jingbo Wang, Guangdong (CN); Yongshuai Zeng, Guangdong (CN); Shijie Xie, Guangdong (CN); Yabing Luo, Guangdong (CN)

(73) Assignee: OPTIMUM BATTERY CO., LTD., Shenzhen (CN)

( * ) Notice: Subject to any disclaimer, the term of this patent is extended or adjusted under 35 U.S.C. 154(b) by 0 days.

(21) Appl. No.: 15/806,358

(22) Filed: Nov. 8, 2017

(65) Prior Publication Data

US 2018/0126869 A1    May 10, 2018

(30) Foreign Application Priority Data

Nov. 8, 2016    (CN) .......................... 2016 1 0982486

(51) Int. Cl.
| | |
|---|---|
| *B29C 51/02* | (2006.01) |
| *B60L 15/20* | (2006.01) |
| *B62D 1/04* | (2006.01) |
| *B60K 26/02* | (2006.01) |
| *B60W 30/18* | (2012.01) |
| *B62D 5/04* | (2006.01) |

(52) U.S. Cl.
CPC .............. *B60L 15/20* (2013.01); *B60K 26/02* (2013.01); *B60K 26/021* (2013.01); *B60W 30/18* (2013.01); *B62D 1/04* (2013.01); *B62D 5/0406* (2013.01); *B62D 5/046* (2013.01); *B60K 2026/028* (2013.01); *Y02T 10/7258* (2013.01)

(58) Field of Classification Search
CPC ................. B29C 51/02; B60L 2240/12; B60L 2240/421; B60L 2240/441
See application file for complete search history.

(56) References Cited

U.S. PATENT DOCUMENTS

| | | | |
|---|---|---|---|
| 8,660,744 B2 * | 2/2014 | Derby, V ............. | A01D 34/824 56/10.8 |
| 2002/0104705 A1 * | 8/2002 | Kuhn, Jr. ............... | B60K 26/00 180/333 |
| 2004/0099468 A1 * | 5/2004 | Chernoff ................. | B60T 7/085 180/409 |
| 2012/0138395 A1 * | 6/2012 | Curtis ...................... | B60L 7/18 188/159 |
| 2018/0222526 A1 * | 8/2018 | Thompson ............... | B62D 9/02 |
| 2018/0266424 A1 * | 9/2018 | Colley ..................... | B60K 8/00 |

* cited by examiner

*Primary Examiner* — Bryan A Evans (57) ABSTRACT

The present invention provides a steering wheel including a main body and a vehicle speed control module positioned on the main body. The vehicle speed control module includes a stator, a rotor coaxial to the stator and rotatable relative to the stator, and a first contact lever positioned on the rotor. The rotor includes a Hall element configured to detect a rotational position of the rotor, and generate a Hall signal according to the rotational position of the rotor. When the first contact lever is rotated in a counterclockwise direction relative to a first initial position, the rotor is driven by the first contact lever to rotate, the Hall element outputs a first Hall signal to a controller of a motor vehicle, and the controller controls the motor vehicle to move forward. The present invention further provides a motor vehicle having the steering wheel.

20 Claims, 6 Drawing Sheets

MOTOR VEHICLE AND STEERING WHEEL THEREOF

CROSS-REFERENCE TO RELATED APPLICATION

The present application claims priority to Chinese patent application No. 201610982486.2 filed on Nov. 8, 2016, the whole disclosure of which is incorporated herein by reference.

BACKGROUND OF THE INVENTION

Field of the Invention

This invention relates to motor vehicles, and more particular, to a motor vehicle having a steering wheel.

Description of the Related Art

At present, it is necessary for a driver to put his foot on an accelerator pedal, to control a speed of a motor vehicle. However, the foot is away from the driver's brain, therefore, a reaction speed of the foot is slow, and a sensitivity of the foot to control the accelerator pedal is not high. Furthermore, during a long-distance driving, the foot is needed to step on the accelerator pedal for a long time, which leads to uncomfortable of the foot and affects the driver to control the car.

It is desirable to provide an invention, which can overcome the problems and limitations mentioned above.

SUMMARY OF THE INVENTION

The present invention is directed to a motor vehicle and a steering wheel of the motor vehicle that substantially obviates one or more of the problems due to limitations and disadvantages of the related art.

In an aspect of the present invention, there is provided a steering wheel comprising a main body and a vehicle speed control module positioned on the main body. The vehicle speed control module comprises a stator, a rotor coaxial to the stator and rotatable relative to the stator, and a first contact lever positioned on the rotor. The rotor comprises a Hall element configured to detect a rotational position of the rotor, and generate a Hall signal according to the rotational position of the rotor. On condition that the first contact lever is rotated in a counterclockwise direction relative to a first initial position, the rotor is driven by the first contact lever to rotate, the Hall element outputs a first Hall signal to a controller of a motor vehicle, and the controller controls the motor vehicle to move forward. The greater of a radian of the first contact lever is rotated in the counterclockwise direction relative to the first initial position, the faster the motor vehicle moves forward. On condition that the first contact lever is rotated in a clockwise direction relative to the first initial position, the rotor is driven by the first contact lever to rotate, the Hall element outputs a second Hall signal to the controller, and the controller controls the motor vehicle to move backward. The greater of a radian of the first contact lever is rotated in the clockwise direction relative to the first initial position, the faster the motor vehicle moves backward.

In another aspect of the present invention, there is provided a motor vehicle comprising a plurality of wheels, a drivetrain configured to drive the wheels, a motor configured to drive the drivetrain, a controller configured to control the motor to operate, and a steering wheel. The steering wheel comprises a main body and a vehicle speed control module positioned on the main body. The vehicle speed control module comprises a stator, a rotor coaxial to the stator and rotatable relative to the stator, and a first contact lever positioned on the rotor. The rotor comprises a Hall element configured to detect a rotational position of the rotor, and generate a Hall signal according to the rotational position of the rotor. On condition that the first contact lever is rotated in a counterclockwise direction relative to a first initial position, the rotor is driven by the first contact lever to rotate, the Hall element outputs a first Hall signal to the controller, the controller controls the motor to operate, according to the first Hall signal, and the motor vehicle moves forward. The greater of a radian of the first contact lever is rotated in the counterclockwise direction relative to the first initial position, the faster the motor vehicle moves forward. On condition that the first contact lever is rotated in a clockwise direction relative to the first initial position, the rotor is driven by the first contact lever to rotate, the Hall element outputs a second Hall signal to the controller, the controller controls the motor to operate, according to the second Hall signal, and the motor vehicle moves backward. The greater of a radian of the first contact lever is rotated in the clockwise direction relative to the first initial position, the faster the motor vehicle moves backward.

It is to be understood that both the foregoing general description and the following detailed description are exemplary and explanatory and are intended to provide further explanations of the invention as claimed.

BRIEF DESCRIPTION OF THE DRAWINGS

Implementations of the present technology will now be described, by way of example only, with reference to the attached drawings. It may be understood that these drawings are not necessarily drawn to scale, and in no way limit any changes in form and detail that may be made to the described embodiments by one skilled in the art without departing from the spirit and scope of the described embodiments.

DETAILED DESCRIPTION OF THE PREFERRED EMBODIMENTS

In order to make the purposes, technical solutions, and advantages of the present invention be clearer, the present invention will be further described in detail hereafter with reference to the accompanying drawings and embodiments. However, it will be understood by those of ordinary skill in the art that the embodiments described herein can be practiced without these specific details. In other instances, methods, procedures and components have not been described in detail so as not to obscure the related relevant feature being described. Also, it should be understood that the embodiments described herein are only intended to illustrate but not to limit the present invention.

Several definitions that apply throughout this disclosure will be presented. The term "coupled" is defined as connected, whether directly or indirectly through intervening components, and is not necessarily limited to physical connections. The connection can be such that the objects are permanently connected or releasably connected. The term "comprise", when utilized, means "include, but not necessarily limited to"; it specifically indicates open-ended inclusion or membership in a so-described combination, group, series and the like.

It should be noted that references to "an" or "one" embodiment in this disclosure are not necessarily to the same embodiment, and such references mean "at least one."

Figure 1:
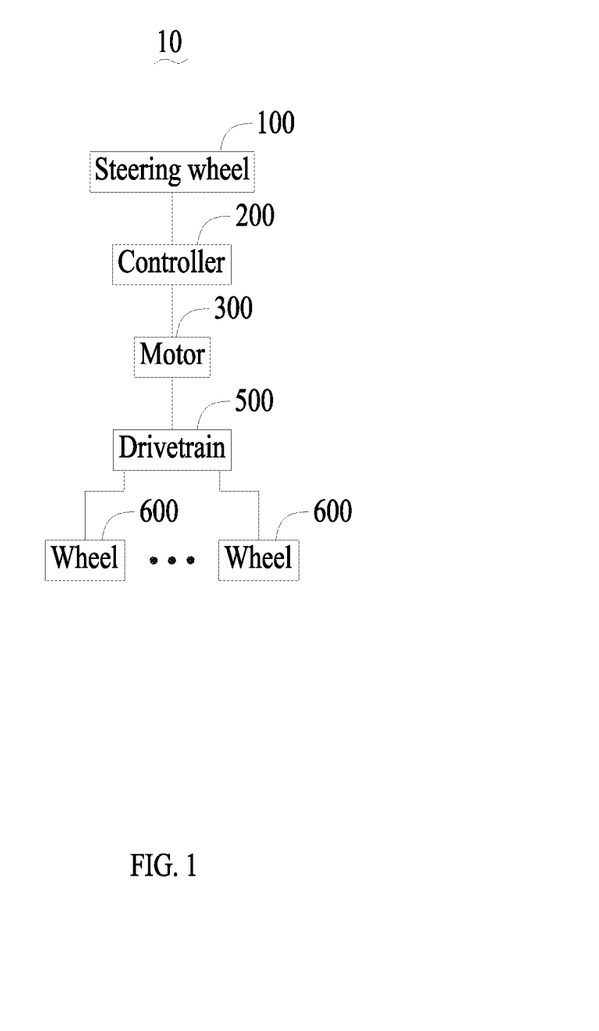
FIG. 1 is a block schematic diagram of a motor vehicle provided by one embodiment of the present invention; wherein the motor vehicle comprises a steering wheel.

FIG. 1 illustrates a block schematic diagram of a motor vehicle 10 provided by one embodiment of the present invention. The motor vehicle 10 comprises a steering wheel 100, a controller 200, a motor 300, a drivetrain 500, and a plurality of wheels 600. The motor 300 is coupled to the steering wheel 100 through the controller 200, and is coupled to the wheels 600 through the drivetrain 500. The controller 200 is configured to control the motor 300 to operate, according to signals received from the steering wheel 100, the motor 300 is configured to drive the drivetrain 500, the drivetrain 500 is configured to drive the wheels 600 to rotate, and therefore a speed of the motor vehicle 10 can be adjusted.

Figure 2:
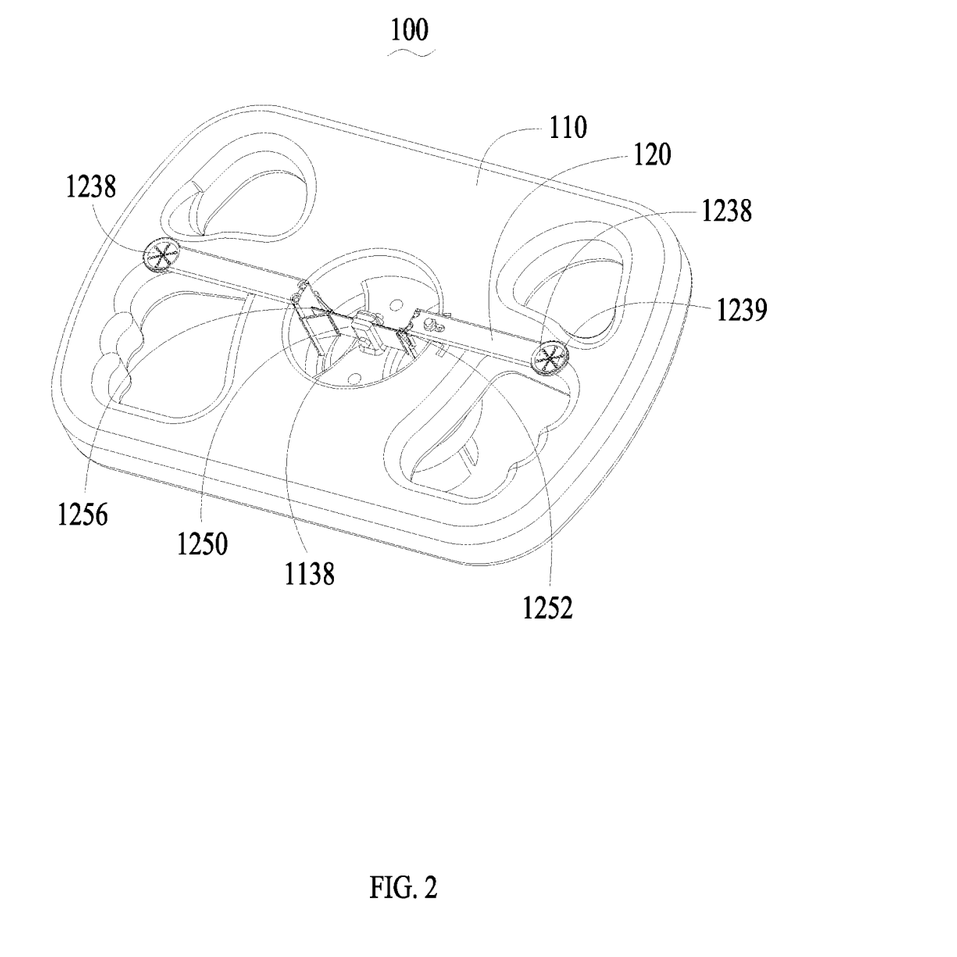
FIG. 2 is an isometric, schematic view of the steering wheel of FIG. 1, wherein the steering wheel comprises a main body and a vehicle speed control module.
Figure 3:
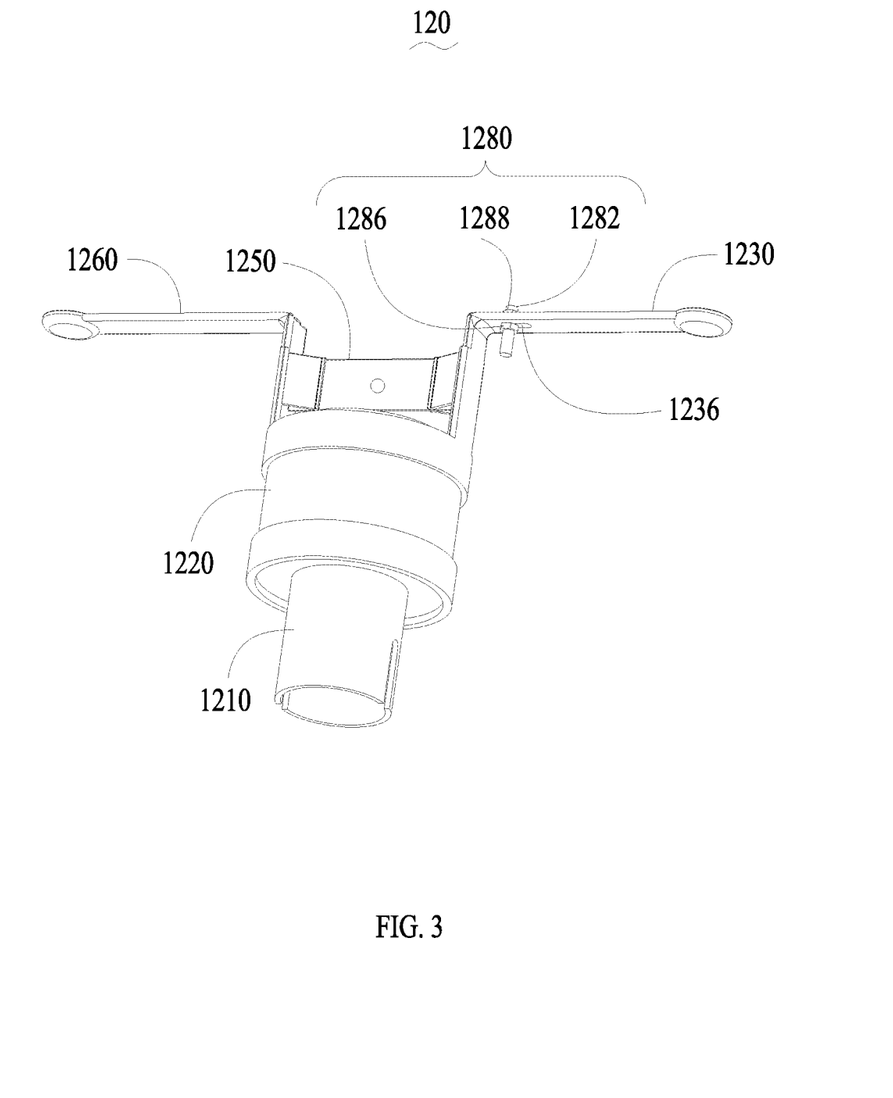
FIG. 3 is an isometric, schematic view of the vehicle speed control module of FIG. 2, wherein the vehicle speed control module comprises a stator and a rotor.

Please refer to FIGS. 2 and 3, the steering wheel 100 comprises a main body 110 and a vehicle speed control module 120 positioned on the main body 110. The vehicle speed control module 120 comprises a stator 1210, a rotor 1220 coaxial to the stator 1210 and rotatable relative to the stator 1210, and a first contact lever 1230 positioned on the rotor 1220.

Figure 4:
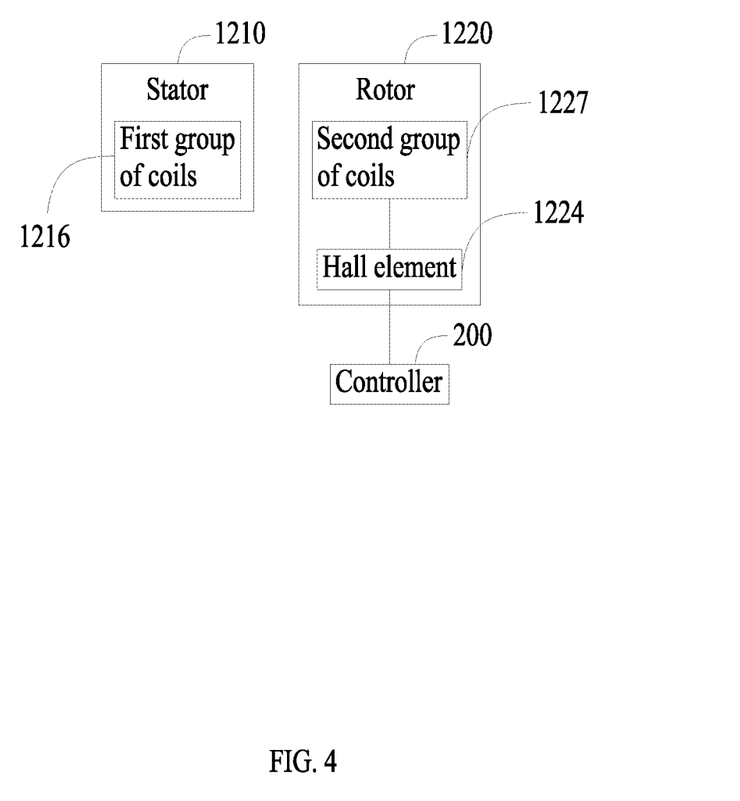
FIG. 4 is a block schematic diagram of the stator and the rotor FIG. 3.

FIG. 4 illustrates a block schematic diagram of the stator 1210 and the rotor 1220. The rotor 1220 comprises a Hall element 1224 configured to detect a rotational position of the rotor 1220, and generate a Hall signal according to the rotational position of the rotor 1220. The Hall element 1224 is electrically coupled to the controller 200, to output the Hall signal to the controller 200. When the first contact lever 1230 is rotated in a counterclockwise direction relative to a first initial position, the rotor 1220 is driven by the first contact lever 1230 to rotate, the Hall element 1224 outputs a first Hall signal to the controller 200, the controller 200 controls the motor 300 to operate, according to the first Hall signal, and the motor vehicle 10 moves forward. The greater of a radian of the first contact lever 1230 is rotated in the counterclockwise direction relative to the first initial position, the faster the motor vehicle 10 moves forward. When the first contact lever 1230 is rotated in a clockwise direction relative to the first initial position, the rotor 1220 is driven by the first contact lever 1230 to rotate, the Hall element 1224 outputs a second Hall signal to the controller 200, the controller 200 controls the motor 300 to operate, according to the second Hall signal, and the motor vehicle 10 moves backward. The greater of a radian of the first contact lever 1230 is rotated in the clockwise direction relative to the first initial position, the faster the motor vehicle 10 moves backward.

In one embodiment, the stator 1210 comprises a first group of coils 1216, and the rotor 1220 further comprises a second group of coils 1227.

Figure 5:
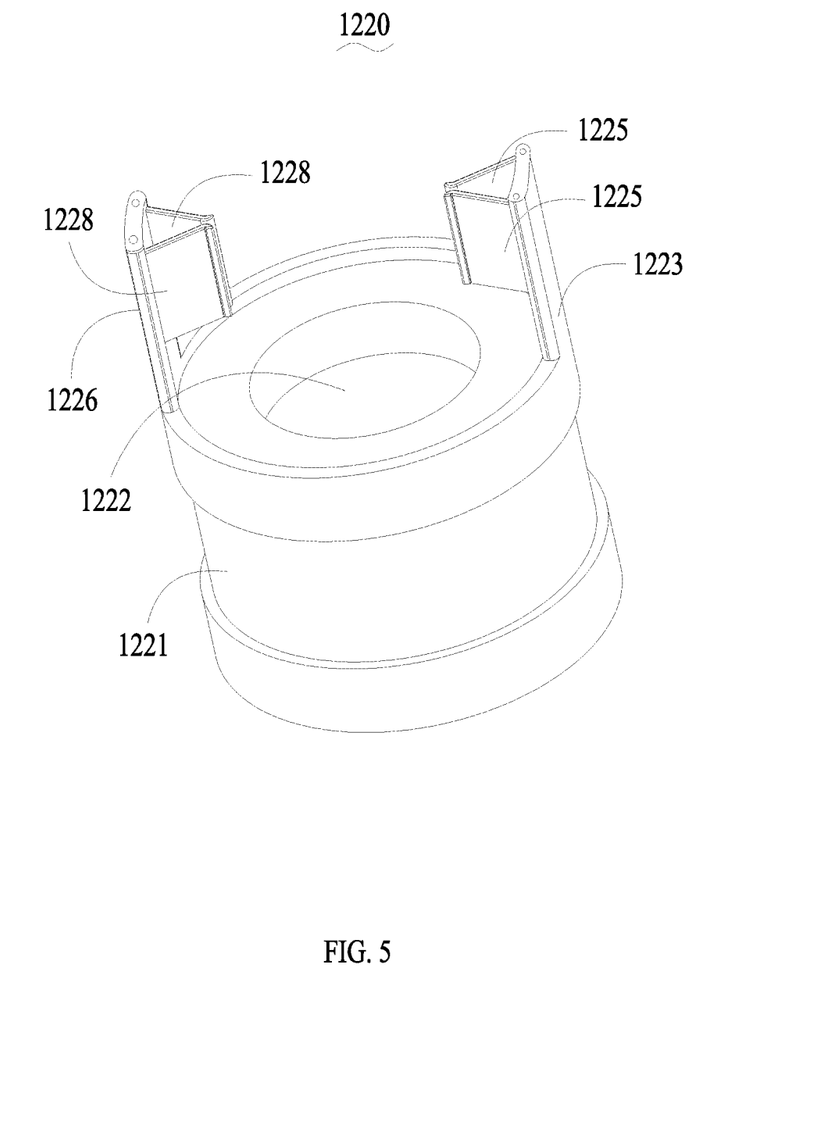
FIG. 5 is an isometric, schematic view of the rotor of FIG. 3.

Please refer to FIGS. 3 to 5, the rotor 1220 comprises a body 1221, a receiving cavity 1222 defined in a middle of the body 1221 and extended through the body 1221, and a first connecting member 1223 extended upwardly along a top edge of the body 1221. The first contact lever 1230 is coupled to the body 1221 through the first connecting member 1223. The Hall element 1224 and the second group of coils 1227 are positioned on the body 1221. A upper portion of the stator 1210 is received in the receiving cavity 1222.

The vehicle speed control module 120 further comprises an elastic member 1250 positioned on the main body 110. The rotor 1220 further comprises two first holding members 1225 movably positioned on opposite side edges of the first connecting member 1223. A first end of the elastic member 1250 is held by the two first holding members 1225. Each first holding member 1225 can rotate around a corresponding side edge of the first connecting member 1223.

The vehicle speed control module 120 further comprises a second contact lever 1260 positioned on the rotor 1220. When the second contact lever 1260 is rotated in the counterclockwise direction relative to a second initial position, the rotor 1220 is driven by the second contact lever 1260 to rotate, the Hall element 1224 outputs a third Hall signal to the controller 200, the controller 200 controls the motor 300 to operate, according to the third Hall signal, and the motor vehicle 10 moves forward. The greater of a radian of the second contact lever 1260 is rotated in the counterclockwise direction relative to the second initial position, the faster the motor vehicle 10 moves forward. When the second contact lever 1260 is rotated in the clockwise direction relative to the second initial position, the rotor 1220 is driven by the second contact lever 1260 to rotate, the Hall element 1224 outputs a fourth Hall signal to the controller 200 of the motor vehicle 10, the controller 200 controls the motor 300 to operate, according to the fourth Hall signal, and the motor vehicle 10 moves backward. The greater of a radian of the second contact lever 1260 is rotated in the clockwise direction relative to the second initial position, the faster the motor vehicle 10 moves backward.

The rotor 1220 further comprises a second connecting member 1226 extended upwardly along the top edge of the body 1221, and two second holding members 1228 movably positioned on opposite side edges of the second connecting member 1226. The second contact lever 1260 is coupled to the body 1221 through the second connecting member 1226. A second end of the elastic member 1250 is held by the two second holding members 1228. Each second holding member 1228 can rotate around a corresponding side edge of the second connecting member 1226.

Please refer to FIGS. 2 to 6, the main body 110 comprises an installing hole 1110, a third connecting member 1130, two third holding members 1136, and a mounting member 1138. The installing hole 1110 is configured to install the vehicle speed control module 120. The third connecting member 1130 is positioned in the installing hole 1110, and divides the installing hole 1110 into a first hole 1111 and a second hole 1112. The two third holding members 1136 are positioned on the third connecting member 1130, and are configured to hold a middle portion of the elastic member 1250. The mounting member 1138 is configured to mount the elastic member 1250 on the two third holding members 1136. The first connecting member 1223 is extended through the first hole 1111 and coupled to the first contact lever 1230; and the second connecting member 1226 is extended through the second hole 1112 and coupled to the second contact lever 1260.

In one embodiment, the mounting member 1138 comprises a first screw (shown in FIG. 2, but not labeled) and a first nut (shown in FIG. 2, but not labeled). A stopping portion is extended from a first end of the first screw. Screw threads are positioned on an outer surface of a second end of the first screw. Each of the elastic member 1250 and the two third holding members 1136 is defined a through hole. The second end of the first screw is extended through the through hole of one of the two third holding members 1136, the through hole of the elastic member 1250, and the through hole of the other of the two third holding members 1136. The stop portion is abutted a sidewall of the one of the two third holding members 1136. The first nut is cooperated with the screw threads to fix the elastic member 1250 on the two third holding members 1136. In other embodiments, the elastic member 1250 may be fixed on the two third holding members 1136 by other means, such as welding or sticking, and the mounting member 1138 may be omitted.

Figure 6:
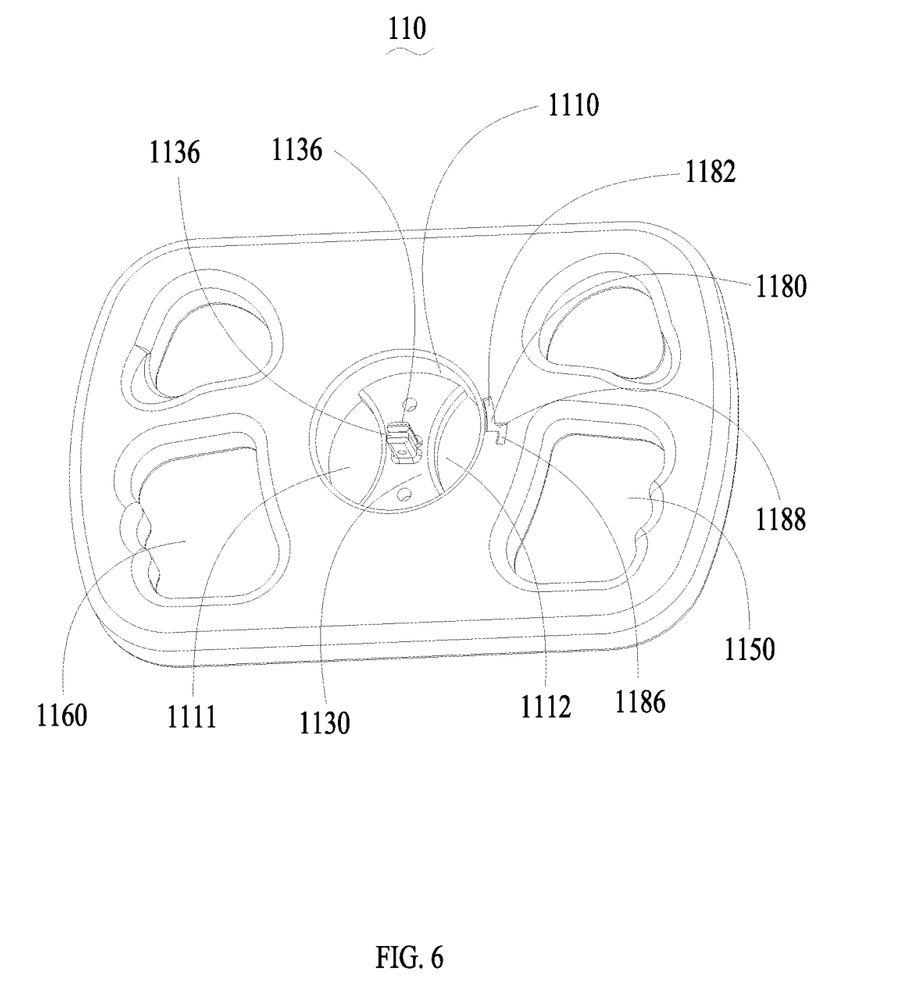
FIG. 6 is an isometric, schematic view of the main body of FIG. 2.

The main body 110 further comprises a first receiving hole 1150 configured to receive one hand of a driver, and a second receiving hole 1160 configured to receive the other hand of the driver. The first contact lever 1230 is adjacent to the first receiving hole 1150; and the second contact lever 1260 is adjacent to the second receiving hole 1160.

The vehicle speed control module 120 further comprises a positioning member 1280 movably positioned on the first contact lever 1230. The main body 110 comprises a first guide slot 1180 configured to receive and guide the positioning member 1280. The first guide slot 1180 comprises a first slot 1182 extended in a first direction, a second slot 1186 extended in a second direction opposite to the first direction, and a third slot 1188 coupled to the first slot 1182 and the second slot 1186. When the first contact lever 1230 is rotated in the counterclockwise direction relative to the first initial position, the positioning member 1280 is in the first slot 1182. When the first contact lever 1230 is rotated in a clockwise direction relative to the first initial position, the positioning member 1280 is in the second slot 1186.

In one embodiment, the first guide slot 1180 is substantially "Z" shaped, the positioning member 1280 and the first guide slot 1180 are configured to guide and position the first contact lever 1230 and the second contact lever 1260, and to prevent misoperation.

In one embodiment, the first contact lever 1230 comprises a second guide slot 1236 configured to receive and guide the positioning member 1280. The positioning member 1280 comprises a second screw 1282, a second nut 1286, and a third nut 1288. The second screw 1282 comprises a first end extended through the first guide slot 1180, and a second terminal extended through the second guide slot 1236. The second nut 1286 is positioned on a middle portion of the second screw 1282, and is contacted to a lower surface of the first contact lever 1230. The third nut 1288 is positioned on the second end of the second screw 1282, and is contacted to an upper surface of the first contact lever 1230.

In one embodiment, each of the first contact lever 1230 and the second contact lever 1260 comprises a bowl-shaped operation portion 1238, and a plurality of circular protrusions 1239 positioned on an upper surface of the operation portion 1238. The plurality of protrusions 1239 are arranged in a "*" shape, and are configured to increase friction. In other embodiments, the operation portion 1238 may be omitted, or may be in other shapes.

In one embodiment, the first initial position of the first contact lever 1230 is on the same straight line as a length direction of the elastic member 1250 when no deformation occurs, and the positioning member 1280 is in the third slot 1188. In other embodiments, the first initial position of the first contact lever 1230 may be adjusted according to the actual situation.

In one embodiment, the second initial position of the second contact lever 1260 is on the same straight line as the length direction of the elastic member 1250 when no deformation occurs, and the positioning member 1280 is in the third slot 1188. In other embodiments, the second initial position of the second contact lever 1260 may be adjusted according to the actual situation.

In one embodiment, the first contact lever 1230 is located on the same straight line as the second contact lever 1260, and each of the first contact lever 1230 and the second contact lever 1260 are positioned on the rotor 1220. When the first contact lever 1230 is rotated, the second contact lever 1260 is rotated accordingly, and the first contact lever 1230 and the second contact lever 1260 are rotated with the same direction and radian. When the second contact lever 1260 is rotated, the first contact lever 1230 is rotated accordingly, and the first contact lever 1230 and the second contact lever 1260 are rotated with the same direction and radian. In other embodiments, the second contact lever 1260, the second connecting member 1226, and the two second holding members 1228 may be omitted.

In one embodiment, a steering ratio of the steering wheel 100 to the wheels 600 is 1:1. That is, a number of degrees of turn of the wheels 600 is equal to a number of degrees of turn of the steering wheel 100. In other embodiments, the steering ratio of the steering wheel 100 to the wheels 600 may be adjusted according to the actual situation.

The operation principle of the motor vehicle 10 and the steering wheel 100 provided by one embodiment of the present invention will be described below.

When the motor vehicle 10 is in a driving state, a right hand and a left hand of the driver can grasp the main body 110, fingers of the right hand can be placed in the first receiving hole 1150, and fingers of the left hand can be placed in the second receiving hole 1160.

When the motor vehicle 10 is needed to accelerate forward, the first end of the second screw 1282 is pushed by the driver, to make the positioning member 1280 locate in the first slot 1182. The first contact lever 1230 is pushed by the driver to rotate in the counterclockwise direction relative to the first initial position, the positioning member 1280 is moved in the first slot 1182, and the rotor 1220 is driven by the first contact lever 1230 to rotate.

An intensity of a magnetic field around the Hall element 1224 is changed, the Hall element 1224 generates the first Hall signal, and outputs the first Hall signal to the controller 200. The controller 200 controls the motor 300 to operate, according to the first Hall signal, the drivetrain 500 is driven by the motor 300, the wheels 600 are driven by the drivetrain 500 to rotate, and the motor vehicle 10 moves forward. The greater of the radian of the first contact lever 1230 is rotated in the counterclockwise direction relative to the first initial position, the faster the motor vehicle 10 moves forward.

In one embodiment, the positioning member 1280 is located in the first slot 1182, to limit a size of the radian of the first contact lever 1230 is rotated in the counterclockwise direction relative to the first initial position, and to prevent the driver from inadvertently pushing the first contact lever 1230 to rotate in the clockwise direction relative to the first initial position.

When the first contact lever 1230 is pushed by the driver to rotate in the counterclockwise direction, the elastic member 1250 is elastically deformed. When the first contact lever 1230 is released by the driver, the elastic member 1250 is restored, and the first contact lever 1230 is driven by the elastic member 1250 to return to the first initial position.

That is, the elastic member 1250 is configured to make the first contact lever 1230 return to the first initial position. When the first contact lever 1230 is driven by the elastic member 1250 to return to the first initial position, the radian of the first contact lever 1230 rotated in the counterclockwise direction relative to the first initial position is gradually decreased, and a speed of the motor vehicle 10 moving forward is gradually decreased.

When the motor vehicle 10 is needed to accelerate backward, the first end of the second screw 1282 is pushed by the driver, to make the positioning member 1280 locate in the second slot 1186. The first contact lever 1230 is pushed by the driver to rotate in the clockwise direction relative to the first initial position, the positioning member 1280 is moved in the second slot 1186, and the rotor 1220 is driven by the first contact lever 1230 to rotate. The intensity of the magnetic field around the Hall element 1224 is changed, the Hall element 1224 generates the second Hall signal, and outputs the second Hall signal to the controller 200. The controller 200 controls the motor 300 to operate, according to the second Hall signal, the drivetrain 500 is driven by the motor 300, the wheels 600 are driven by the drivetrain 500 to rotate, and the motor vehicle 10 moves backward. The greater of the radian of the first contact lever 1230 is rotated in the clockwise direction relative to the first initial position, the faster the motor vehicle 10 moves backward.

In one embodiment, the positioning member 1280 is located in the second slot 1186, to limit a size of the radian of the first contact lever 1230 is rotated in the clockwise direction relative to the first initial position, and to prevent the driver from inadvertently pushing the first contact lever 1230 to rotate in the counterclockwise direction relative to the first initial position.

When the first contact lever 1230 is pushed by the driver to rotate in the clockwise direction, the elastic member 1250 is elastically deformed. When the first contact lever 1230 is released by the driver, the elastic member 1250 is restored, and the first contact lever 1230 is driven by the elastic member 1250 to return to the first initial position. When the first contact lever 1230 is driven by the elastic member 1250 to return to the first initial position, the radian of the first contact lever 1230 rotated in the clockwise direction relative to the first initial position is gradually decreased, and the speed of the motor vehicle 10 moving backward is gradually decreased.

When the driver is inconvenient to push the first contact lever 1230 with the right hand, the second contact lever 1260 can be pushed by the left hand, and a position of the positioning member 1280 can be adjusted by the left hand. When the second contact lever 1260 is pushed by the left hand to rotate in the counterclockwise direction relative to the second initial position, the motor vehicle 10 moves forward. The greater of the radian of the second contact lever 1260 is rotated in the counterclockwise direction relative to the second initial position, the faster the motor vehicle 10 moves forward. When the second contact lever 1260 is pushed by the left hand to rotate in the clockwise direction relative to the second initial position, the motor vehicle 10 moves backward. The greater of the radian of the second contact lever 1260 is rotated in the clockwise direction relative to the second initial position, the faster the motor vehicle 10 moves backward. A process of the driver using the left hand to push the second contact lever 1260 to control the speed of the motor vehicle 10, is similar to a process of the driver using the right hand to push the first contact lever 1230 to control the speed of the motor vehicle 10, and is not repeated here. That is, a function of pushing the second contact lever 1260 is similar to a function of pushing the first contact lever 1230, therefore, convenience of operation is enhanced.

As detail above, the vehicle speed control module 120 is positioned on the steering wheel 100; the first contact lever 1230 and the second contact lever 1260 are rotated in the counterclockwise direction or the clockwise direction to change the intensity of the magnetic field around the Hall element 1224, and the Hall signals outputted from the Hall element 1224 is changed accordingly; and the controller 200 controls the motor vehicle 10 to move forward or backward, according to the Hall signal received from the Hall element 1224. Therefore, the driver can adjust the speed of the motor vehicle 10 by operating the steering wheel 100 with hands, which is simple and convenient.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A steering wheel (100), comprising:
    a main body (110); and
    a vehicle speed control module (120) positioned on the main body (110), the vehicle speed control module (120) comprising:
        a stator (1210);
        a rotor (1220) coaxial to the stator (1210), and rotatable relative to the stator (1210), the rotor (1220) comprising a Hall element (1224) configured to detect a rotational position of the rotor (1220), and generate a Hall signal according to the rotational position of the rotor (1220); and
        a first contact lever (1230) positioned on the rotor (1220);
    wherein on condition that the first contact lever (1230) is rotated in a counterclockwise direction relative to a first initial position, the rotor (1220) is driven by the first contact lever (1230) to rotate, the Hall element (1224) outputs a first Hall signal to a controller (200) of a motor vehicle (10), and the controller (200) controls the motor vehicle (10) to move forward;
    wherein the greater of a radian of the first contact lever (1230) is rotated in the counterclockwise direction relative to the first initial position, the faster the motor vehicle (10) moves forward;
    wherein on condition that the first contact lever (1230) is rotated in a clockwise direction relative to the first initial position, the rotor (1220) is driven by the first contact lever (1230) to rotate, the Hall element (1224) outputs a second Hall signal to the controller (200), and the controller (200) controls the motor vehicle (10) to move backward; and
    wherein the greater of a radian of the first contact lever (1230) is rotated in the clockwise direction relative to the first initial position, the faster the motor vehicle (10) moves backward.

2. The steering wheel (100) of claim 1, wherein the rotor (1220) comprises a body (1221), a receiving cavity (1222) defined in a middle of the body (1221) and extended through the body (1221), and a first connecting member (1223) extended upwardly along a top edge of the body (1221); the first contact lever (1230) is coupled to the body (1221)

through the first connecting member (1223), the Hall element (1224) is positioned on the body (1221), and a upper portion of the stator (1210) is received in the receiving cavity (1222).

3. The steering wheel (100) of claim 2, wherein the vehicle speed control module (120) further comprises an elastic member (1250) positioned on the main body (110), the rotor (1220) further comprises two first holding members (1225) movably positioned on opposite side edges of the first connecting member (1223), and a first end of the elastic member (1250) is held by the two first holding members (1225).

4. The steering wheel (100) of claim 3, wherein the vehicle speed control module (120) further comprises a second contact lever (1260) positioned on the rotor (1220);
wherein on condition that the second contact lever (1260) is rotated in the counterclockwise direction relative to a second initial position, the rotor (1220) is driven by the second contact lever (1260) to rotate, the Hall element (1224) outputs a third Hall signal to the controller (200), and the controller (200) controls the motor vehicle (10) to move forward;
wherein the greater of a radian of the second contact lever (1260) is rotated in the counterclockwise direction relative to the second initial position, the faster the motor vehicle (10) moves forward;
wherein on condition that the second contact lever (1260) is rotated in the clockwise direction relative to the second initial position, the rotor (1220) is driven by the second contact lever (1260) to rotate, the Hall element (1224) outputs a fourth Hall signal to the controller (200), and the controller (200) controls the motor vehicle (10) to move backward; and
wherein the greater of a radian of the second contact lever (1260) is rotated in the clockwise direction relative to the second initial position, the faster the motor vehicle (10) moves backward.

5. The steering wheel (100) of claim 4, wherein the rotor (1220) further comprises a second connecting member (1226) extended upwardly along the top edge of the body (1221), and two second holding members (1228) movably positioned on opposite side edges of the second connecting member (1226); the second contact lever (1260) is coupled to the body (1221) through the second connecting member (1226); and a second end of the elastic member (1250) is held by the two second holding members (1228).

6. The steering wheel (100) of claim 5, wherein the main body (110) comprises:
an installing hole (1110) configured to install the vehicle speed control module (120);
a third connecting member (1130) positioned in the installing hole (1110) and dividing the installing hole (1110) into a first hole (1111) and a second hole (1112);
two third holding members (1136) positioned on the third connecting member (1130), and configured to hold a middle portion of the elastic member (1250); and
a mounting member (1138) configured to mount the elastic member (1250) on the two third holding members (1136); and
wherein the first connecting member (1223) is extended through the first hole (1111) and coupled to the first contact lever (1230); and the second connecting member (1226) is extended through the second hole (1112) and coupled to the second contact lever (1260).

7. The steering wheel (100) of claim 4, wherein the main body (110) further comprises a first receiving hole (1150) configured to receive one hand of a driver, and a second receiving hole (1160) configured to receive the other hand of the driver; the first contact lever (1230) is adjacent to the first receiving hole (1150); and the second contact lever (1260) is adjacent to the second receiving hole (1160).

8. The steering wheel (100) of claim 1, wherein the vehicle speed control module (120) further comprises a positioning member (1280) movably positioned on the first contact lever (1230); the main body (110) comprises a first guide slot (1180) configured to receive and guide the positioning member (1280); the first guide slot (1180) comprises a first slot (1182) extended in a first direction, a second slot (1186) extended in a second direction opposite to the first direction, and a third slot (1188) coupled to the first slot (1182) and the second slot (1186);
wherein on condition that the first contact lever (1230) is rotated in the counterclockwise direction relative to the first initial position, the positioning member (1280) is in the first slot (1182); and
wherein on condition that the first contact lever (1230) is rotated in a clockwise direction relative to the first initial position, the positioning member (1280) is in the second slot (1186).

9. The steering wheel (100) of claim 8, wherein the first contact lever (1230) comprises a second guide slot (1236) configured to receive and guide the positioning member (1280); and the positioning member (1280) comprises:
a screw (1282) comprising a first end extended through the first guide slot (1180), and a second terminal extended through the second guide slot (1236);
a first nut (1286) positioned on a middle portion of the screw (1282), and contacted to a lower surface of the first contact lever (1230); and
a second nut (1288) positioned on the first end of the screw (1282), and contacted to an upper surface of the first contact lever (1230).

10. The steering wheel (100) of claim 1, wherein the first contact lever (1230) comprises a bowl-shaped operation portion (1238), and a plurality of circular protrusions (1239) positioned on an upper surface of the operation portion (1238); and the plurality of protrusions (1239) are arranged in a "*" shape.

11. A motor vehicle (10), comprising:
a plurality of wheels (600);
a drivetrain (500) configured to drive the wheels (600) to rotate;
a motor (300) configured to drive the drivetrain (500);
a controller (200) configured to control the motor (300) to operate; and
a steering wheel (100) comprising:
a main body (110); and
a vehicle speed control module (120) positioned on the main body (110), the vehicle speed control module (120) comprising:
a stator (1210);
a rotor (1220) coaxial to the stator (1210), and rotatable relative to the stator (1210), the rotor (1220) comprising a Hall element (1224) configured to detect a rotational position of the rotor (1220), and generate a Hall signal according to the rotational position of the rotor (1220); and
a first contact lever (1230) positioned on the rotor (1220);
wherein on condition that the first contact lever (1230) is rotated in a counterclockwise direction relative to a first initial position, the rotor (1220) is driven by the first contact lever (1230) to rotate, the Hall element (1224) outputs a first Hall signal to the controller (200), the controller (200) controls the motor (300) to operate, according to the first Hall signal, and the motor vehicle (10) moves forward;

wherein the greater of a radian of the first contact lever (1230) is rotated in the counterclockwise direction relative to the first initial position, the faster the motor vehicle (10) moves forward;

wherein on condition that the first contact lever (1230) is rotated in a clockwise direction relative to the first initial position, the rotor (1220) is driven by the first contact lever (1230) to rotate, the Hall element (1224) outputs a second Hall signal to the controller (200), the controller (200) controls the motor (300) to operate, according to the second Hall signal, and the motor vehicle (10) moves backward; and wherein the greater of a radian of the first contact lever (1230) is rotated in the clockwise direction relative to the first initial position, the faster the motor vehicle (10) moves backward.

12. The motor vehicle (10) of claim 11, wherein the rotor (1220) comprises a body (1221), a receiving cavity (1222) defined in a middle of the body (1221) and extended through the body (1221), and a first connecting member (1223) extended upwardly along a top edge of the body (1221); the first contact lever (1230) is coupled to the body (1221) through the first connecting member (1223), the Hall element (1224) is positioned on the body (1221), and a upper portion of the stator 1210 is received in the receiving cavity (1222).

13. The motor vehicle (10) of claim 12, wherein the vehicle speed control module (120) further comprises an elastic member (1250) positioned on the main body (110), the rotor (1220) further comprises two first holding members (1225) movably positioned on opposite side edges of the first connecting member (1223), and a first end of the elastic member (1250) is held by the two first holding members (1225).

14. The motor vehicle (10) of claim 13, wherein the vehicle speed control module (120) further comprises a second contact lever (1260) positioned on the rotor (1220);

wherein on condition that the second contact lever (1260) is rotated in the counterclockwise direction relative to a second initial position, the rotor (1220) is driven by the second contact lever (1260) to rotate, the Hall element (1224) outputs a third Hall signal to the controller (200), the controller (200) controls the motor (300) to operate, according to the third Hall signal, and the motor vehicle (10) moves forward;

wherein the greater of a radian of the second contact lever (1260) is rotated in the counterclockwise direction relative to the second initial position, the faster the motor vehicle (10) moves forward;

wherein on condition that the second contact lever (1260) is rotated in the clockwise direction relative to the second initial position, the rotor (1220) is driven by the second contact lever (1260) to rotate, the Hall element (1224) outputs a fourth Hall signal to the controller (200) of the motor vehicle (10), the controller (200) controls the motor (300) to operate, according to the fourth Hall signal, and the motor vehicle (10) moves backward; and wherein the greater of a radian of the second contact lever (1260) is rotated in the clockwise direction relative to the second initial position, the faster the motor vehicle (10) moves backward.

15. The motor vehicle (10) of claim 14, wherein the rotor (1220) further comprises a second connecting member (1226) extended upwardly along the top edge of the body (1221), and two second holding members (1228) movably positioned on opposite side edges of the second connecting member (1226); the second contact lever (1260) is coupled to the body (1221) through the second connecting member (1226); and a second end of the elastic member (1250) is held by the two second holding members (1228).

16. The motor vehicle (10) of claim 15, wherein the main body (110) comprises:

an installing hole (1110) configured to install the vehicle speed control module (120);

a third connecting member (1130) positioned in the installing hole (1110) and dividing the installing hole (1110) into a first hole (1111) and a second hole (1112);

two third holding members (1136) positioned on the third connecting member (1130), and configured to hold a middle portion of the elastic member (1250); and a mounting member (1138) configured to mount the elastic member (12500 on the two third holding members (1136); and wherein the first connecting member (1223) is extended through the first hole (1111) and coupled to the first contact lever (1230); and the second connecting member (1226) is extended through the second hole (1112) and coupled to the second contact lever (1260).

17. The motor vehicle (10) of claim 14, wherein the main body (110) further comprises a first receiving hole (1150) configured to receive one hand of a driver, and a second receiving hole (1160) configured to receive the other hand of the driver; the first contact lever (1230) is adjacent to the first receiving hole (1150); and the second contact lever (1260) is adjacent to the second receiving hole (1160).

18. The motor vehicle (10) of claim 11, wherein the vehicle speed control module (120) further comprises a positioning member (1280) movably positioned on the first contact lever (1230); the main body (110) comprises a first guide slot (1180) configured to receive and guide the positioning member (1280); the first guide slot (1180) comprises a first slot (1182) extended in a first direction, a second slot (1186) extended in a second direction opposite to the first direction, and a third slot (1188) coupled to the first slot (1182) and the second slot (1186);

wherein on condition that the first contact lever (1230) is rotated in the counterclockwise direction relative to the first initial position, the positioning member (1280) is in the first slot (1182); and wherein on condition that the first contact lever (1230) is rotated in a clockwise direction relative to the first initial position, the positioning member (1280) is in the second slot (1186).

19. The motor vehicle (10) of claim 18, wherein the first contact lever (1230) comprises a second guide slot (1236) configured to receive and guide the positioning member (1280); and the positioning member (1280) comprises:

a screw (1282) comprising a first end extended through the first guide slot (1180), and a second terminal extended through the second guide slot (1236);

a first nut (1286) positioned on a middle portion of the screw (1282), and contacted to a lower surface of the first contact lever (1230); and a second nut (1288) positioned on the first end of the screw (1282), and contacted to an upper surface of the first contact lever (1230).

20. The motor vehicle (10) of claim 11, wherein a steering ratio of the steering wheel (100) to the wheels (600) is 1:1.

* * * * *